US012122623B2

(12) United States Patent
Silva et al.

(10) Patent No.: US 12,122,623 B2
(45) **Date of Patent: *Oct. 22, 2024**

(54) EMERGENCY STOP CUTTING MECHANISM FOR A WEB REWINDING DEVICE

(71) Applicant: Tecnau, Inc., North Andover, MA (US)

(72) Inventors: Stephen E. Silva, Waltham, MA (US); Gregory Mercurio, Billerica, MA (US)

(73) Assignee: Tecnau, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 18/204,369

(22) Filed: May 31, 2023

(65) Prior Publication Data

US 2023/0391574 A1 Dec. 7, 2023

Related U.S. Application Data

(60) Continuation of application No. 17/222,124, filed on Apr. 5, 2021, now Pat. No. 11,667,487, which is a continuation of application No. 16/655,378, filed on Oct. 17, 2019, now Pat. No. 10,968,065, which is a division of application No. 15/430,289, filed on Feb. 10, 2017, now Pat. No. 10,464,769.

(51) Int. Cl.

| | |
|---|---|
| ***B65H 26/00*** | (2006.01) |
| ***B26D 5/08*** | (2006.01) |
| ***B26D 7/26*** | (2006.01) |
| ***B65H 26/02*** | (2006.01) |

(52) U.S. Cl.

CPC ............. *B65H 26/00* (2013.01); *B26D 5/086* (2013.01); *B26D 7/2614* (2013.01); *B65H 26/02* (2013.01)

(58) Field of Classification Search

CPC ........ B65H 26/00; B65H 26/02; B26D 5/086; B26D 7/2614

See application file for complete search history.

(56) References Cited

U.S. PATENT DOCUMENTS 8,764,182 B2 7/2014 Ogawa
9,089,985 B2 7/2015 Hatakeyama
(Continued)

FOREIGN PATENT DOCUMENTS

DE 4030600 A1 4/1992
DE 102009017885 A1 10/2009
(Continued)

*Primary Examiner* — Sang K Kim
(74) *Attorney, Agent, or Firm* — Loginov & Associates, PLLC; William A. Loginov

(57) ABSTRACT

This invention provides web-cutting mechanism that can be mounted in line at an appropriate location between the web-handling peripheral (printer) and a web roll. The cutting mechanism operates before the available storage in the winder festoon has been exhausted, and decouples the roll's energy from the web. The cutting mechanism can employ a blade that is drawn through the web solely by the movement of the web itself. The blade is mounted at a (e.g.) 45-degree angle to web travel, causing it to be pulled through the web. A negator spring assembly and associated cable drives the blade into the side edge of the web when a slide-mounted blade shuttle assembly is released by a latching pawl of a solenoid assembly. The solenoid is triggered by a signal indicating an emergency stop condition, such as an upstream jam.

15 Claims, 12 Drawing Sheets

(56) References Cited

U.S. PATENT DOCUMENTS

| | | | | |
|---|---|---|---|---|
| 10,464,769 | B2 | 11/2019 | Silva | |
| 10,968,065 | B2 | 4/2021 | Silva | |
| 11,667,487 | B2 * | 6/2023 | Silva | B26D 7/2614<br>242/527 |
| 2010/0051736 | A1 | 3/2010 | Enwald | |
| 2013/0276609 | A1 | 10/2013 | Hatakeyama | |
| 2015/0346106 | A1 | 12/2015 | Eder | |

FOREIGN PATENT DOCUMENTS

| | | | |
|---|---|---|---|
| EP | 0692378 | A2 | 1/1996 |
| EP | 2447069 | A1 | 5/2012 |
| GB | 1058836 | A | 2/1967 |

* cited by examiner

EMERGENCY STOP CUTTING MECHANISM FOR A WEB REWINDING DEVICE

RELATED APPLICATIONS

This application is a continuation of co-pending U.S. patent application Ser. No. 17/222,124, entitled EMERGENCY STOP CUTTING MECHANISM FOR A WEB REWINDING DEVICE, filed Apr. 5, 2021, which is a continuation of co-pending U.S. patent application Ser. No. 16/655,378, entitled EMERGENCY STOP CUTTING MECHANISM FOR A WEB REWINDING DEVICE, filed Oct. 17, 2019, now U.S. Pat. No. 10,968,065, issued Apr. 6, 2021, which is a divisional of co-pending U.S. patent application Ser. No. 15/430,289, filed Feb. 10, 2017, entitled EMERGENCY STOP CUTTING MECHANISM FOR A WEB REWINDING DEVICE, now U.S. Pat. No. 10,464,769, issued Nov. 5, 2019 the entire disclosure of each of which applications is herein incorporated by reference.

FIELD OF THE INVENTION

This invention relates to web handling and feeding devices used in a flexible printing environment, and more particularly to web cutting devices.

BACKGROUND OF THE INVENTION

The use of rolled web (e.g. paper) in conjunction with a digital printer and various peripherals (e.g. cuttings, slitters, folders, stackers, etc.) has become a ubiquitous technique for producing a variety of printed materials. A typical web-handling/printing arrangement involves the use of a web unwinder, which can be driven at its core and/or its outer perimeter, and which passes through the various web-handling peripherals. The output web from the peripheral(s) can then be rewound, by a core-driven, or surface-driven rewinder onto an output web roll. This web roll can be used in further handling processes (e.g. further printing, cutting, stacking, folding, etc.). Typically one or more (e.g. dancer) loops are present between the components of the system, typically to sense the demand for web at input and output of the components. The size of the loop is used to speed or slow the rotation of unwinder and/or rewinder. The loop contains a sufficient festoon of web so that the amount of web therein can absorb any unevenness in web flow the acceleration and deceleration of the unwinder/rewinder. This generally avoids over-tensioning of the web and damage to components.

The trend in this industry is toward heavier paper stocks and higher web speeds (e.g. 500 fpm or more). This combination of factors engenders a scenario in which the web is under enormous tension in the event of a sudden stoppage. In the event that amount of web stored in the festoon (loop(s)) between components becomes exhausted (taken up) before the slowly decelerating rewinder (which is reacting to an emergency stop condition by shutting down) comes to a full stop, then the flywheel energy generated by the spinning web roll(s), combined with a very strong web, transmits substantial forces back through the rewinder and into the output end of the printer/peripheral, as that web becomes suddenly taut.

It is desirable to provide a mechanism that avoids the potential damaging effect of a heavy, taut web during an emergency stoppage of the printer or other peripheral interconnected to a rewinder, or a stoppage/jam within the feed path of the rewinder itself.

SUMMARY OF THE INVENTION

This invention overcomes disadvantages of the prior art by providing a straightforward, cross-device, traveling razor knife/blade web-cutting mechanism that can be mounted in line at an appropriate location between the web-handling peripheral (printer) and a web roll in a winding device, which leverages the tension in a moving web, to draw a blade through it, and separate the rotating roll from the throughput web. The cutting mechanism is advantageously arranged to operate before the available storage in the winder festoon has been exhausted/taken up. Since it can be challenging or impossible to fully stop a large roll of web in time, the cutting mechanism, instead, effectively decouples the roll's energy from the web before the available festoon storage has been taken up, and taut web impact damage occurs. The cutting mechanism can employ a blade that is drawn through the web solely by the movement of the running web itself. The mechanism includes a blade holder shuttle that travels in a line across the device, through the width of the web on a ball slide, perpendicular to travel direction (and opposing side edges) of the web. The blade is, itself, mounted at a (e.g.) 45-degree angle with respect to the direction of web travel, which causes it to be pulled through the web based upon a cross-web component of force generated by web motion. A negator spring assembly and cable drives the blade into the side edge of the web when a slide-mounted blade shuttle assembly is released by a latching pawl of a solenoid assembly. The solenoid is triggered by a signal indicating an emergency stop condition, such as an upstream jam. When the blade initially engages the side edge of the moving web (undergoing an emergency stop with the winder decelerating, but still in motion) the web motion thereby generates a cross-web a vector component of force that effectively drives the blade fully (or nearly fully) across the web width. Thus, once the blade catches the edge of the web, it is drawn into, and across, the web at a speed proportional to the web's drive speed. In operation, and depending on the web strength, the blade begins the cross-web cut, and then the last portion bursts under tension, which satisfies the primary desire to separate the roll from the running web of paper. The blade includes shuttle plate assembly that is manually engaged into the home latch assembly by the operator. A tab protrudes from where the operator can grasp it, and slide it back toward (e.g.) the operator side of the machine into the latch it relative to the solenoid assembly. Operationally, an emergency stop signal causes the solenoid assembly to release a latching pawl, and thereby allow a negator spring assembly, and associated monofilament cable, to pull the shuttle plate assembly and blade into the edge of the running web. Illustratively, a controller is programmed to energize the release solenoid assembly only in the event of an emergency or similar exigency. Illustratively the blade can comprise a commercially available, common utility knife blade. Optionally, the blade corners can be rounded to increase handling safety for a user during (e.g.) blade replacement. Notably, the slide mechanism associated with the shuttle plate assembly is housed between two cover plates to protect it from becoming easily contaminated with paper dust. This arrangement of covers also serves to render the blade substantially inaccessible to the user at any point.

In an illustrative embodiment a web-cutting mechanism is provided, which includes a housing located upstream in a direction of motion of a web from a web roll that winds the web thereonto. A slide is mounted in the housing, which guides a shuttle assembly having a blade in a cross-web direction that is transverse to the direction of motion. A blade driver selectively biases the shuttle assembly so that the blade engages into a side of the web while tensioned between the web roll and an upstream location. A release receives a signal indicating a condition in which separation of the web is desired, and in response thereto, allows the shuttle assembly to be biased by the blade driver. The blade is oriented at an angle with respect to the direction of motion that induces a cross-web component of force in response to web motion that moves the blade and shuttle assembly at least part way in the cross-web direction. Illustratively, the housing comprises a pair for confronting plates with upper shoulders offset from each other forming a space within which the blade moves in the cross-web direction. The slide can comprise a ball slide upon which the shuttle assembly slides located between the confronting plates. The blade driver can comprise a negator spring assembly and cable that draws the shuttle assembly in the cross-web direction. Also, the release can comprise a solenoid driven latching member that selectively engages and releases the shuttle assembly. The shuttle assembly can include a tab that is arranged to allow a user to grasp the tab and slide the shuttle assembly into engagement with the latching member. The tab can be located above the upper shoulders so as to allow the user to avoid placing a hand near the blade or an interior of the housing. The latching member can comprise a rotating pawl connected to a shaft and a lever, with the lever being interconnected with a pulling piston of the solenoid, and the latching member can include a spring that biases the pawl into engagement with the shuttle assembly when the solenoid is not energized. Illustratively, the blade can comprise a common, commercially available utility knife blade, which can define rounded corners for operator safety during handling. The shuttle assembly can include a blade mount that removably engages the blade and that orients the blade at a non-perpendicular angle of attack with respect to a plane of the web to enhance cutting action. The blade can be oriented at an approximately 45-degree angle with respect to the direction of motion. In various embodiments, the system includes a controller that responds to a web jam or stop condition upstream of the housing, and that generates the signal in response thereto. The housing can be mounted along a web feed path within a web rewinder having an input and a take-up roll. Illustratively, the rewinder can include a festoon of web that buffers the web feed path between the input and the take-up roll.

In a further illustrative embodiment, a web winder is provided, which includes an input that receives web on a feed path from an upstream handling device, and a take-up roll that is driven to form the web into a roll as it is delivered at the input. An emergency stop cutting mechanism is located between the input and the take-up roll that, in response to a stop signal, releases a blade oriented at a non-perpendicular angle to a feed direction of the feed path so that, when the blade is engaged with the web in motion, it is biased across the web to separate the web. The winder can also include a buffer of web festooned between the input and the cutting mechanism. The blade can be mounted on a shuttle that is released by a solenoid in response to the stop signal from a location remote from an edge of the web and that is driven into engagement with the web via a spring assembly. Illustratively, the spring assembly can comprise a cable and a negator spring assembly that biases the cable.

BRIEF DESCRIPTION OF THE DRAWINGS

The invention description below refers to the accompanying drawings, of which.

DETAILED DESCRIPTION

Figure 1:
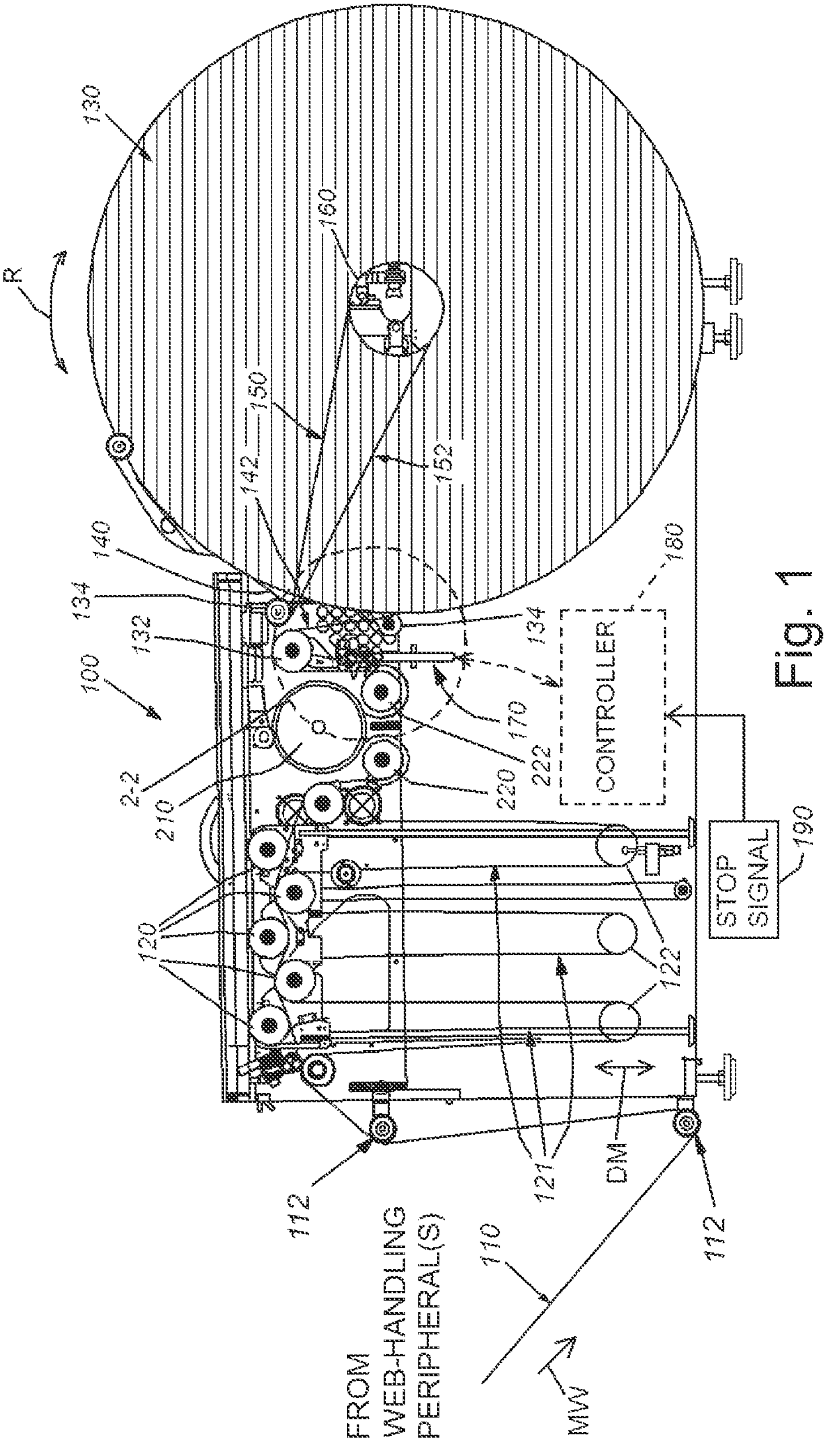
FIG. 1 is an exposed side view of a winder device (e.g. a rewinder) having an integral emergency stop web-cutting mechanism according to an illustrative embodiment.

FIG. 1 is an exposed side view of a web winder 100 by way of non-limiting example. The winder 100 is arranged to rewind web 110 that has been processed by an upstream handling/utilization device, such as an electronic printer (not shown). The web moves downstream (motion arrow MW) through the winder 100 from an assembly of idler rollers 112, or other appropriate input arrangement, into a series of rollers 120 within the winder housing that suspend the web into a set of festooned loops 121. The loops 121 are weighted down by corresponding dancer bars or rollers 122 that move upwardly and downwardly (double arrow DM) in to build and take up an accumulated length of web. This accumulated length of web is used to compensate for changes in the rate between web fed into the winder 100 and web taken up by the winder roll 130. The web exits the festoon and passes through a serpentine path to at least one of the input roller(s) 132 and 134 that reside upstream of the roll 130. In an exemplary embodiment, the roll 130 can be wound via a top-wind path (input web 140) or a bottom-wind path (input web 142). The two paths 150 and 152 are also shown with respect to the roll core 160 (at the beginning of the roll-winding process). In this manner, the roll 130 can be wound with either of the opposing faces of the web facing outwardly.

Figure 2:
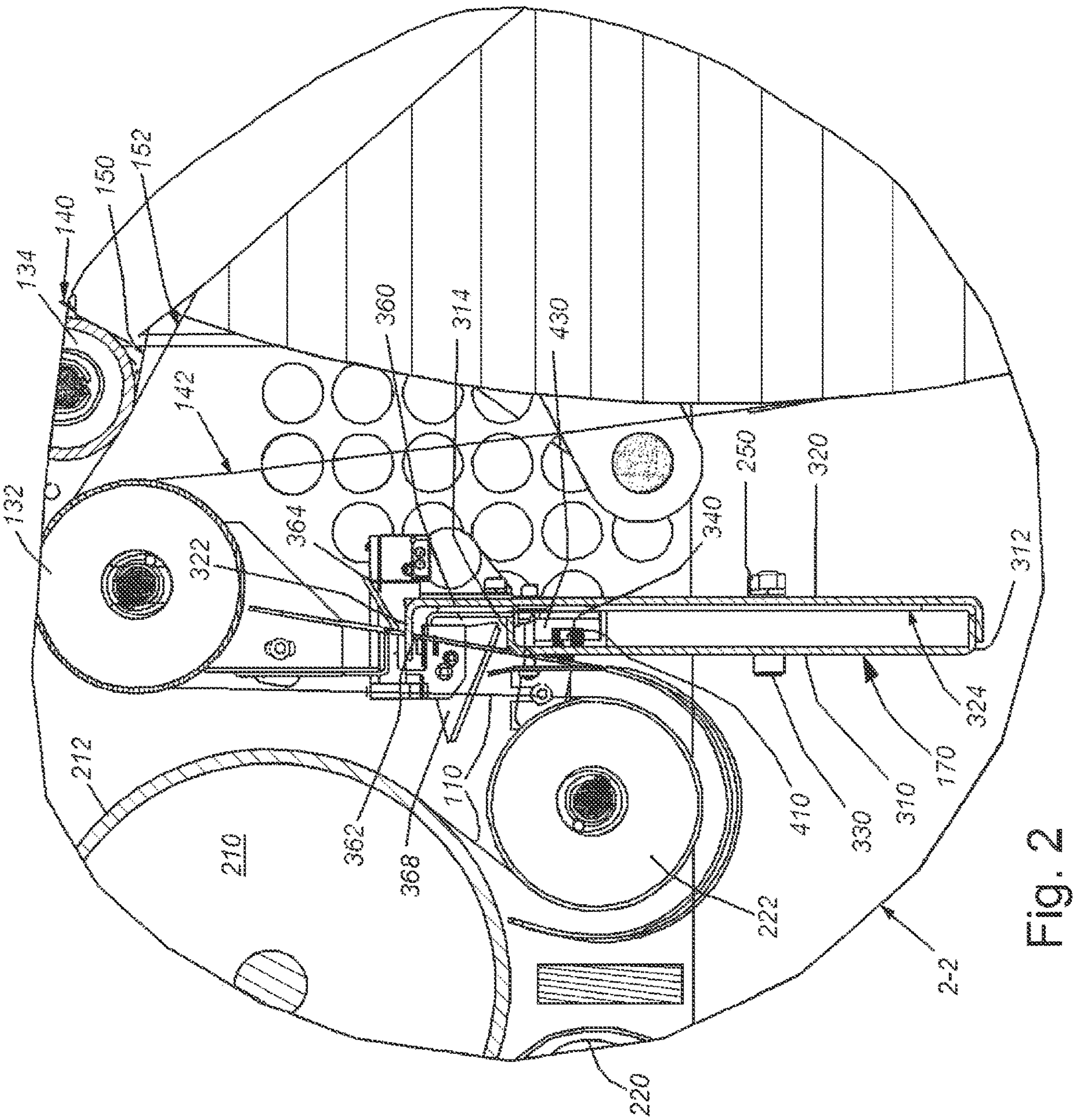
FIG. 2 is a more detailed, fragmentary side view of the portion of the web feed path of the winder of FIG. 1 that includes that web-cutting mechanism.

As described above, an emergency stop condition (e.g. due to a jam within the upstream printer, or at another location within a peripheral device or the web path of the winder itself) can cause the roll 130 to take up the entire festoon of loops 121 before coming to a complete stop, thereby inducing substantial stress on the web within the feed path. This stress can damage one or more components of the printing arrangement. To avoid this potentially damaging condition, the feed path includes an emergency stop web cutting mechanism 170 according to an illustrative embodiment. With further reference to FIG. 2 (showing fragmentary section 2-2 from FIG. 1 in further detail), the web 110 winds around a brake drum 210 with a surface 212 having a roughened/hardened texture—for example plasma-sprayed tungsten carbide, located downstream of the festooned loops 121. The input and output ends of the drum 210, are flanked by rollers 220 and 222 that assist in wrapping the web 110 about the brake drum 210. The downstream output web from roller 222 is guided upwardly into the web-cutting mechanism 170 according to an illustrative embodiment. Thus the mechanism 170 resides between the festooned loops 121 and upstream handling device (not shown) and the downstream roll 130, thereby providing a safety measure in the event that a jam or other stop condition occurs at the handling device or winder feed rollers (e.g. 112, 120 201, 220, 222, etc.).

Figure 3:
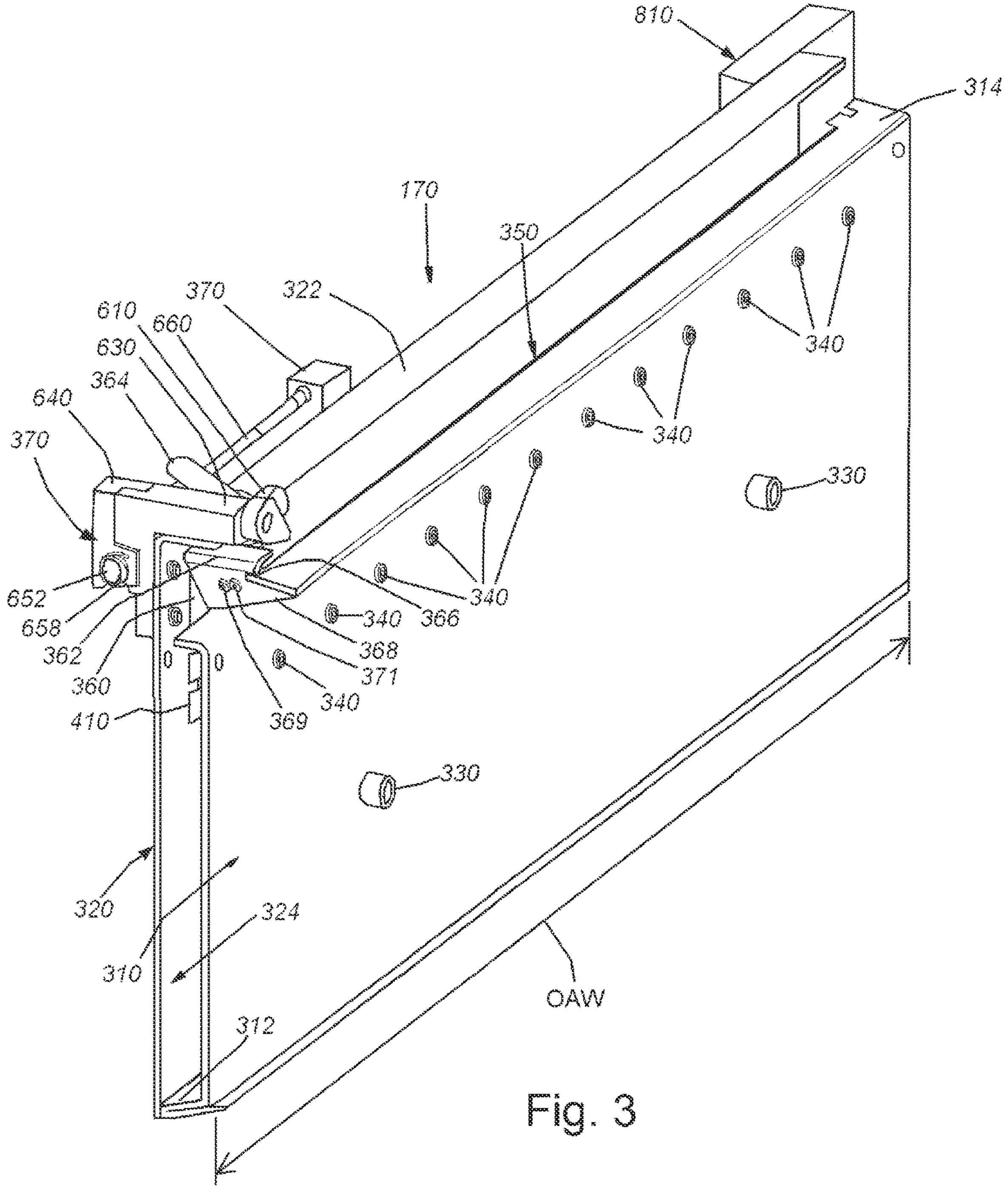
FIG. 3 is a perspective view of the web-cutting mechanism of the winder shown in FIG. 1.
Figure 4:
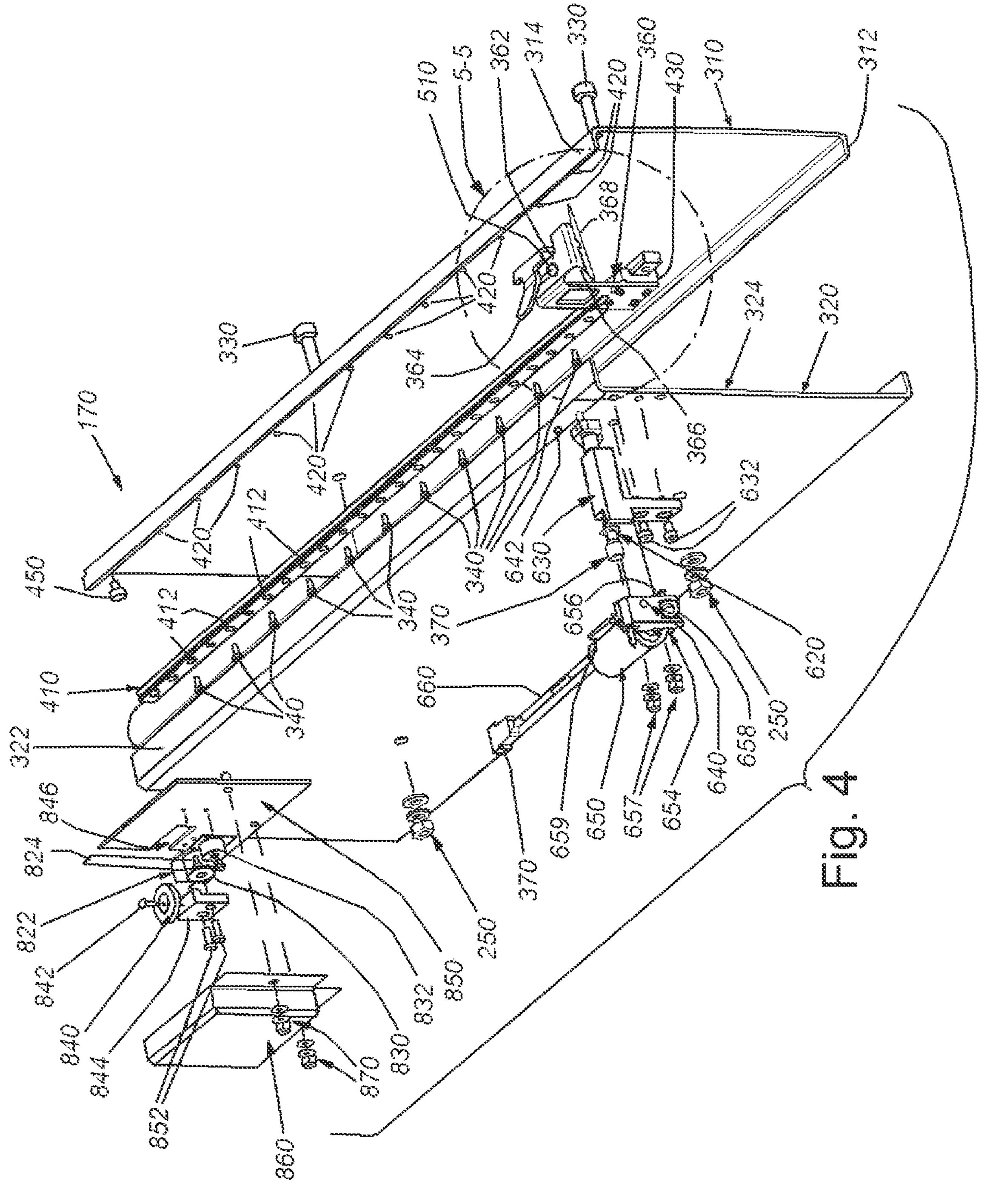
FIG. 4 is an exploded perspective view of the various components and assemblies of the web-cutting mechanism shown in FIG. 3.
Figure 5:
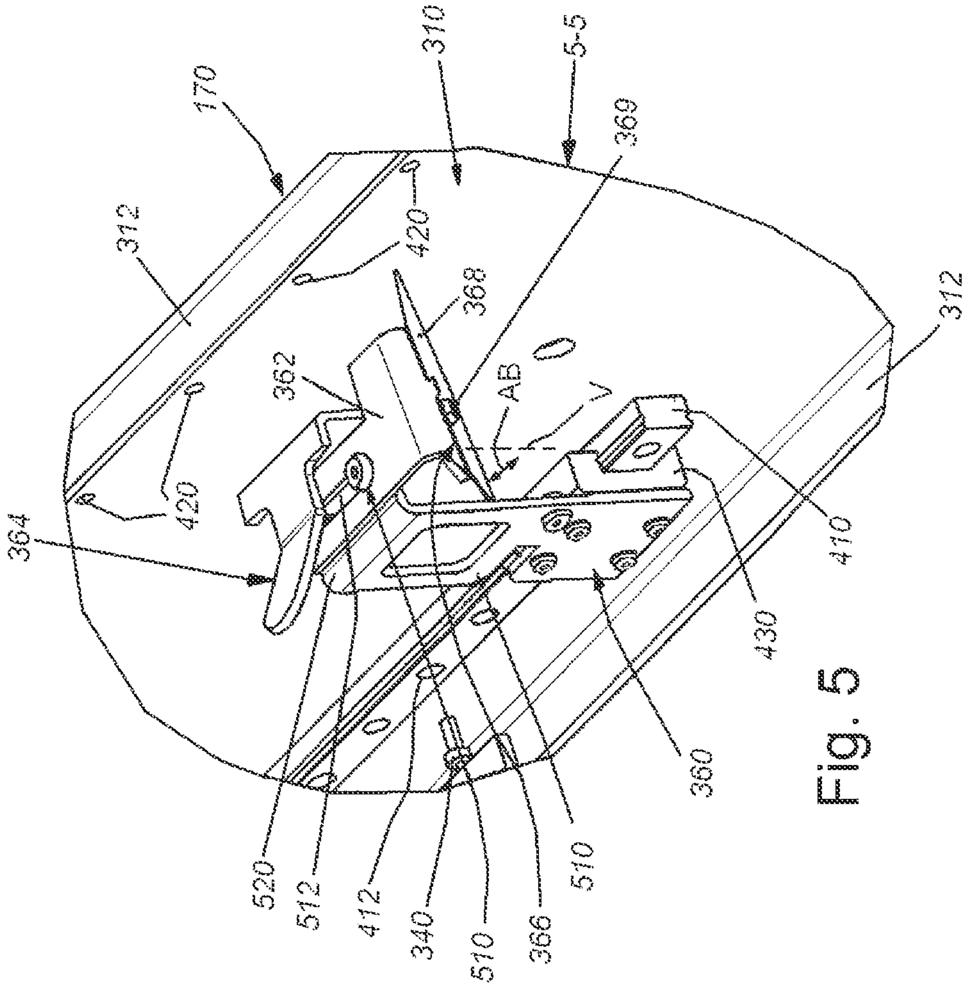
FIG. 5 is a more detailed, fragmentary perspective view of the blade assembly of the web-cutting mechanism shown in FIG. 3.

Reference is now made to FIGS. 3-5, which show the web-cutting mechanism 170 in further detail. As shown in the external view of FIG. 3, the mechanism 170 includes a pair of plates 310 and 320 that support and house for the various components of the mechanism. The upstream plate 310 includes bottom shoulders 312 and 314 that are forms as inwardly-bend, right-angle strips that confront the inner face 324 of the downstream plate 320. The plates are secured together by screws/bolts 330 and corresponding nut/washer assemblies 250 (see FIGS. 2 and 4). This arrangement creates an interior space into which a slide, formed as a keyway, is positioned. The slide can have any appropriate length—in this embodiment it is 670 millimeters long. Note that the overall width OAW (FIG. 3) of the mechanism is highly variable based on the maximum width of the web directed through the winder. In this exemplary embodiment the width OAW is between approximately 700 and 900 millimeters. The slide can be implemented as any acceptable arrangement in a variety of sizes and shapes. For example, a ball-bearing slide and/or pillow block arrangement can be employed in alternate embodiments. As shown, the slide is attached to the upstream plate 310 using (e.g.) rivets, screws or equivalent fasteners 340 that pass through holes 420 in the plate 310. The number and placement of such fasteners 340 is highly variable. In this embodiment, the fasteners 340 are placed incrementally along the length of the slide 410 relative to existing fastener holes 412 as shown. Note that the arrangement of cover plates 310 and 320 in the mechanism 170 helps to enclose and house the ball slide mechanism in a manner that protects it from excessive paper dust contamination during extended hours of operation under various conditions.

The top shoulder 312 of the plate 310 defines a gap 350 through which a vertically oriented shuttle plate 360 extends. The thickness of the plate (which can be (e.g.) 2-millimeter to 5-millimeter sheet metal). The shuttle plate 360 is attached to a slide block 430 that rides on the slide 410. With further reference to the more-detailed section 5-5 from FIG. 4, the shuttle plate 360 supports a blade mount assembly 362 at its upper end. A fastener 510 secures the blade mount assembly 362 to the L-shaped top 520 of the shuttle plate 360. The fastener can be a screw that allows for fine adjustment of the position of the blade assembly based upon the slot 512. The blade mount assembly 362 is positioned so that it resides below the top shoulder 322 of the downstream plate 320. This location and the arrangement of the shoulder 322 serve to protect the user from the blade mount assembly 362 by providing a partial shield that overrides the blade assembly and associated sliding components. As described below, the user can engage the shuttle plate and associated blade mount assembly 362 via a tab 364 that is bet into an upwardly angled shape, and forms an upper extension of the shuttle plate 360 residing above the shielding plate shoulder 322. The tab 364 can define any appropriate shape and size and can optionally include a variety of friction-producing grip surface (e.g. sand-blasted, roughened, rubberized, checkered, etc.). It can be painted a bright color to attract the user's attention (e.g. red, yellow, etc.).

The blade mount assembly 362 can be formed from sheet metal (similar to the shuttle plate 360), and includes a mounting base 366 that is bent at an angle AB with respect to the vertical (dashed line V) of approximately 45 degrees. This angle is exemplary of a wide range of non-vertical angles that can generate a cross-web component of force, as described below. The mounting base 366 is arranged to support a blade 368 according to an embodiment using a fastener (screw 369) that passes through one of the conventional notches (or a custom-drilled hole) on the top edge of the blade 368. In this embodiment, the blade 368 can comprise a conventional utility knife blade. Such a blade is durable, inexpensive and easily replaceable by loosening the screw 369, removing the blade, installing a new blade and tightening the screw 369. More generally, the blade and other components of the mechanism 170 are readily accessed by loosening the screw and nut assemblies 330, 250 and separating the covering plates 310 and 320 to expose the interior features of the mechanism. The blade 368 is tilted about the axis defined by the screw 369 to afford the best cutting angle of attack with respect to the passing web. By way of non-limiting example, a double-ended blade, with a generally trapezoidal shape, a height of approximately ¾ inch and a length of approximately 2⅜ inches. Note that conventional blades include two top notches. One of the top notches receives the screw 369 that retains the blade with respect to the mounting base. As second set screw 371 (or similar structure), with a smaller diameter than the retaining screw 369, provides a raised bump that receives the second notch and stabilizes the blade on the base 366 *t* the desired angle of attack. In an embodiment, the opposing points of the blade 369 can be rounded-over to reduce the chance that the user will be injured during blade replacement. Such rounding can be performed by grinding, clipping, etc.

Figure 6:
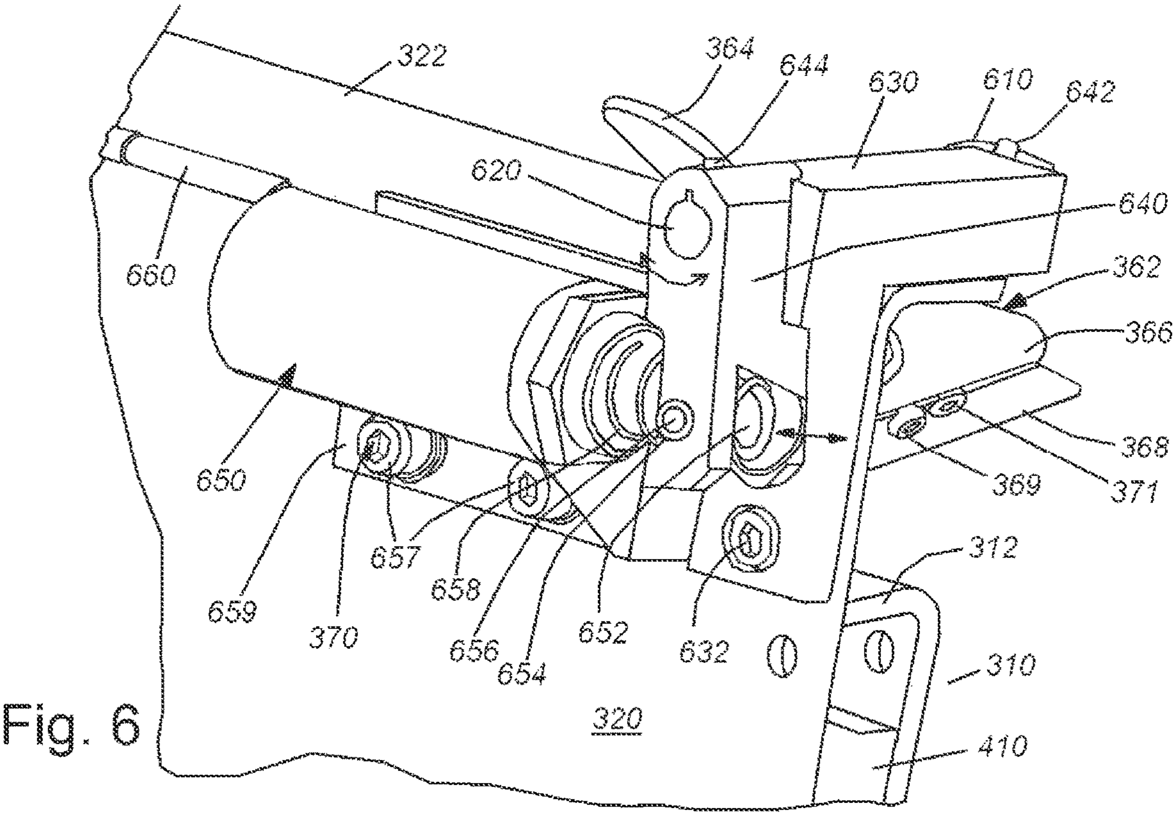
FIGS. 6 and 7 are fragmentary perspective views of the solenoid assembly for selectively releasing the blade assembly of FIG. 5.
Figure 7:
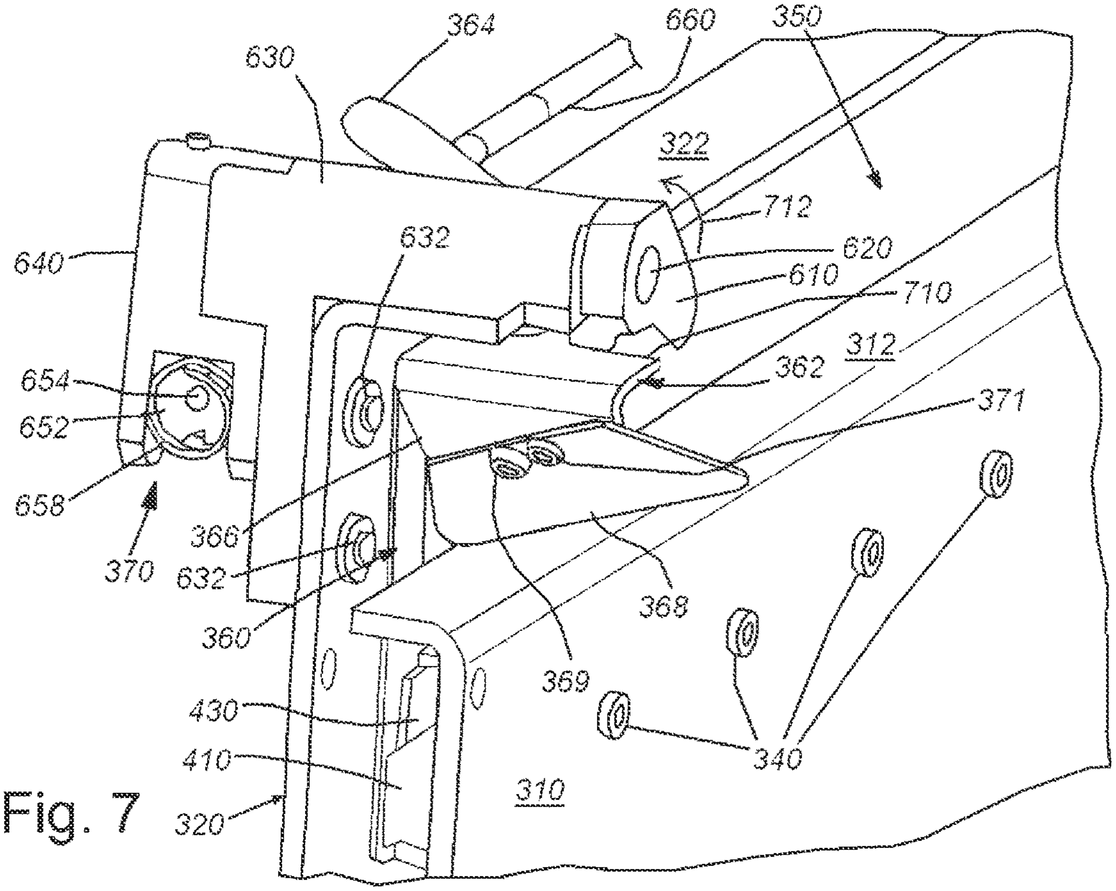

The blade arrangement is shown located with respect to a solenoid assembly 370. The solenoid assembly 370 is shown and described with further reference to FIGS. 6 and 7. Note that the depicted location for the blade arrangement is its resting home base during normal operation, in which it is remote from the side edge of the passing web. The solenoid assembly 370 locks the shuttle plate 360 of the blade arrangement in place. This is accomplished by a rotating pawl 610 that selectively interferes with a shoulder 710 formed on the blade mount assembly 362. The pawl 610 acts as a catch that when rotated downwardly interferes and when rotated upwardly (curved arrow 712) is placed out of interference with the shoulder 710. More particularly, the pawl 610 rotates with respect to a shaft 620 that passes through a bracket 630. The bracket 630 is secured to the downstream plate 320 as shown using (e.g. fasteners 632. The opposing end of the shaft is secured to a lever 640 so that selective movement of the lever 640 results in rotation of the pawl between an engaged and disengaged position with the shoulder 710 of the blade mount assembly 362. Pins or set screws 642 and 644 maintain the pawl 610 and lever 640 in an axially and rotationally fixed relationship with respect to the shaft 620.

The lever 640 is moved by an interconnected plunger 652 of an electromagnetic solenoid 650. The solenoid can be implemented to pull the plunger 652 when energized, and can operate on (e.g.) 24 Volt DC in a non-limiting example. The plunger 652 is also pinned (via pin 654) to the lever in a manner that allows rotation of the pinned joint. A circlip 656 or other retaining structure (e.g. a screw head) can prevent walk-out of the pin 654. A compression spring 658 is provided around the plunger 652 between the base of the solenoid 650 and the lever. By way of non-limiting example, the spring can have a free length of approximately 1 inch, and can define an inner diameter of 0.455 inch using 0.030 wire. The spring 658 is under predetermined compression when installed so as to bias the pawl 610 into the depicted engaged state with respect to the shoulder 710. This compression is overcome, and the pawl 610 is rotated into a disengaged state by energizing the solenoid 650 to rotate the lever 640, shaft 620 and pawl 6710 with respect to the bracket 630. The solenoid 650 is mounted to the downstream plate 320 using an appropriate bracket 659 and fastener assemblies (screws and washers) 657 as shown.

The solenoid 650 includes an electrical connection 660 and associated connector 370 (FIGS. 3 and 4) that can be operatively connected with a relay or other component in a controller 180 (FIG. 1) that switches the solenoid when a stop signal 190 is received. The stop signal can be issued automatically, when an upstream component or peripheral senses a web jam, or manually, by operation of a user—for example, pressing an emergency stop switch.

Figure 8:
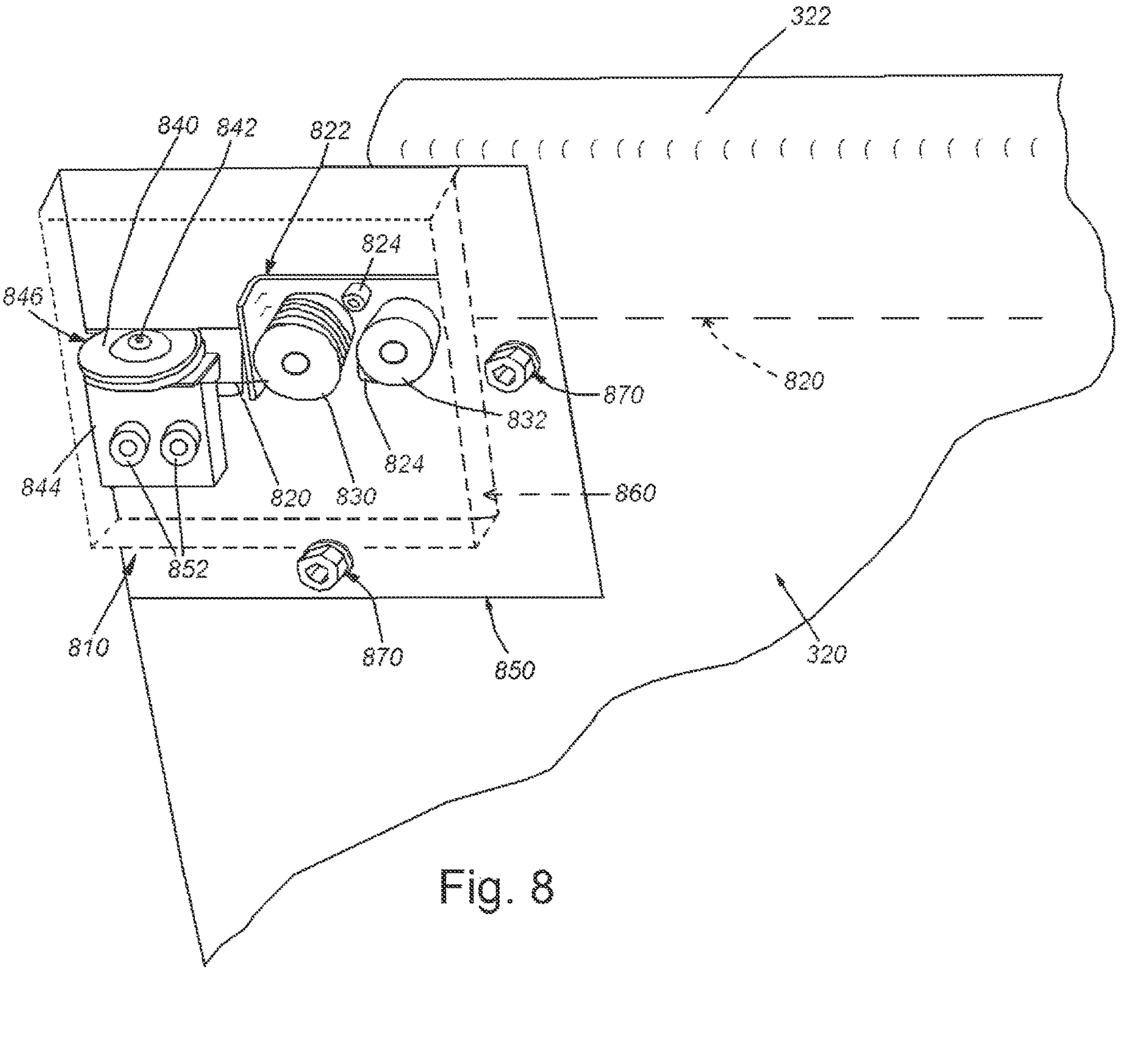
FIG. 8 is an exposed, fragmentary perspective view of the negator spring assembly for biasing the blade assembly into engagement with the web when released by the solenoid assembly.

The release of the pawl 610 by the solenoid 650 allows the shuttle plate 360 to slide widthwise into the edge of the web from a position remote from the edge. The shuttle plate 360 is biased by a negator spring assembly 810 and associated (e.g.) monofilament cable 820, which is described in further detail below, and shown partially in FIG. 8. The negator spring assembly 810 acts as a retractor for the cable 820, providing a predetermined, relatively small biasing force that bears against the restraining action of the engaged pawl 610. In this, manner, when the pawl 610 is released, the cable draws the shuttle toward the assembly, bringing it into contact with the adjacent side edge of the moving web 110. The amount of biasing force is determined by the strength of the winding drum arrangement 822 with rollers 830 and 832 that pay up the cable 820. This arrangement 822 can be conventional in design. It is attached to an assembly base plate 850 using rivets 824 or similar fasteners. The cable 820 is routed from the arrangement 822 around a pulley 840. The pulley rotates on a pivot (fastener 842) secured to a base 844 that is, itself attached to the base plate 850 using fasteners 852 as shown. The pulley is mounted on the base 844 so that it passes through a slot 846 in the base plate 850. The base plate 850 and an overlying cover 860 are secured to the downstream plate 320 by bolt assemblies 870.

Because the pulley 840 passes through the plane of the downstream plate 320, one side resides relative to the outer face of the downstream plate and the opposing side of the pulley resides relative to the inner face of the downstream plate, within the enclosure between the two plates 310 and 320. The cable 820, thus, extends within the enclosure as shown by the dashed line section. It is connected on an opposite end from the pulley 840 at the shuttle plate 360.

Figure 9A:
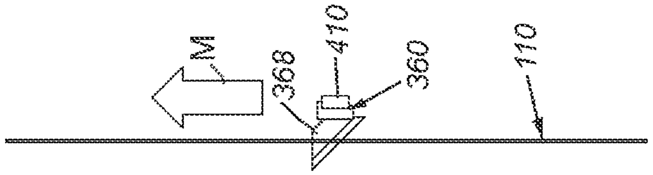
FIG. 9A is a side view of the web of FIG. 9 showing the relative orientation of the blade in the blade assembly.
Figure 9:
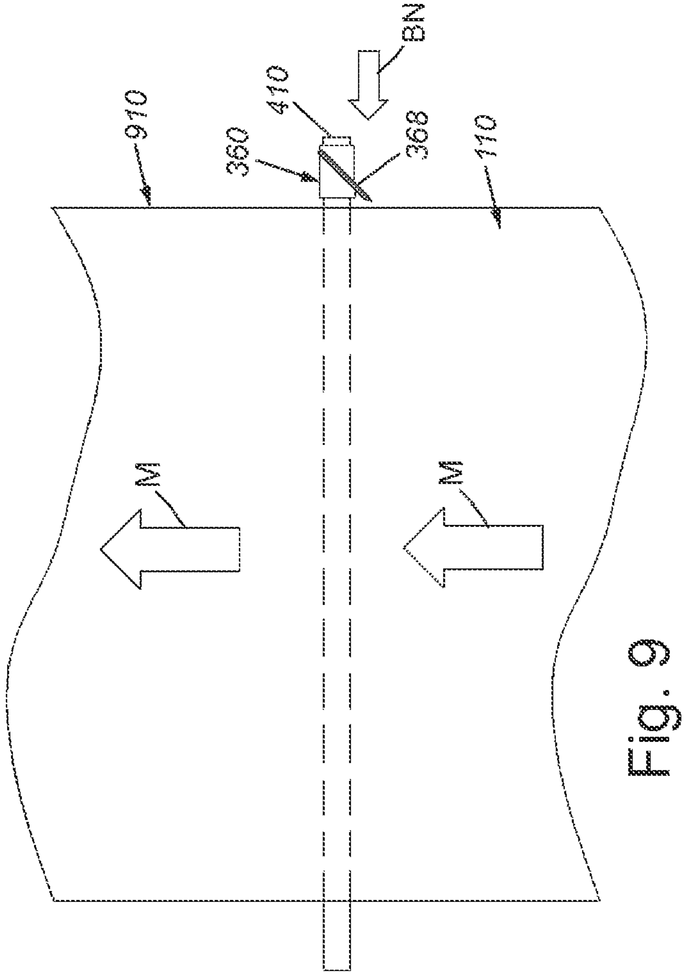
FIG. 9 is a front view of the web path of the winder of FIG. 1 showing the web passing through the web-cutting mechanism, with the blade assembly shown in a disengaged position.
Figure 10:
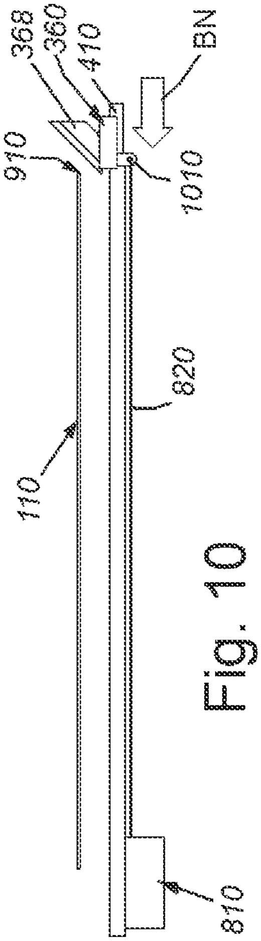
FIG. 10 is a top view of the web and web cutting mechanism shown in FIG. 8.

Having described the illustrative structure of the emergency stop web-cutting mechanism according to an embodiment, the function of the mechanism in operation is now described with reference to FIGS. 9-18. The views of the mechanism have been simplified for the purpose of these figures to show the slide 410, shuttle plate assembly 360, blade 368 and web 110. In FIGS. 9, 9A and 10, the shuttle plate 360 and blade 368 are shown at the home base location remote from the side edge 910 of the web 110, which passes (downstream motion arrow M) through the mechanism under draw of the roll 130 in (FIG. 1). The blade 368 and shuttle plate 360 are held in place by the engaged pawl (610) against the widthwise draw/bias (arrow BN) of the negator spring assembly 810 and associated cable 820. Thus, the cable 820 remains in tension. Note that the cable 820 is attached the shuttle plate assembly 360 at an attachment location 1010 (FIG. 10) using any acceptable retention technique (e.g. knots, crimps, adhesives, etc.). The web 110 appears flat and planar as it is under normal tension in the region of the mechanism.

Figure 11:
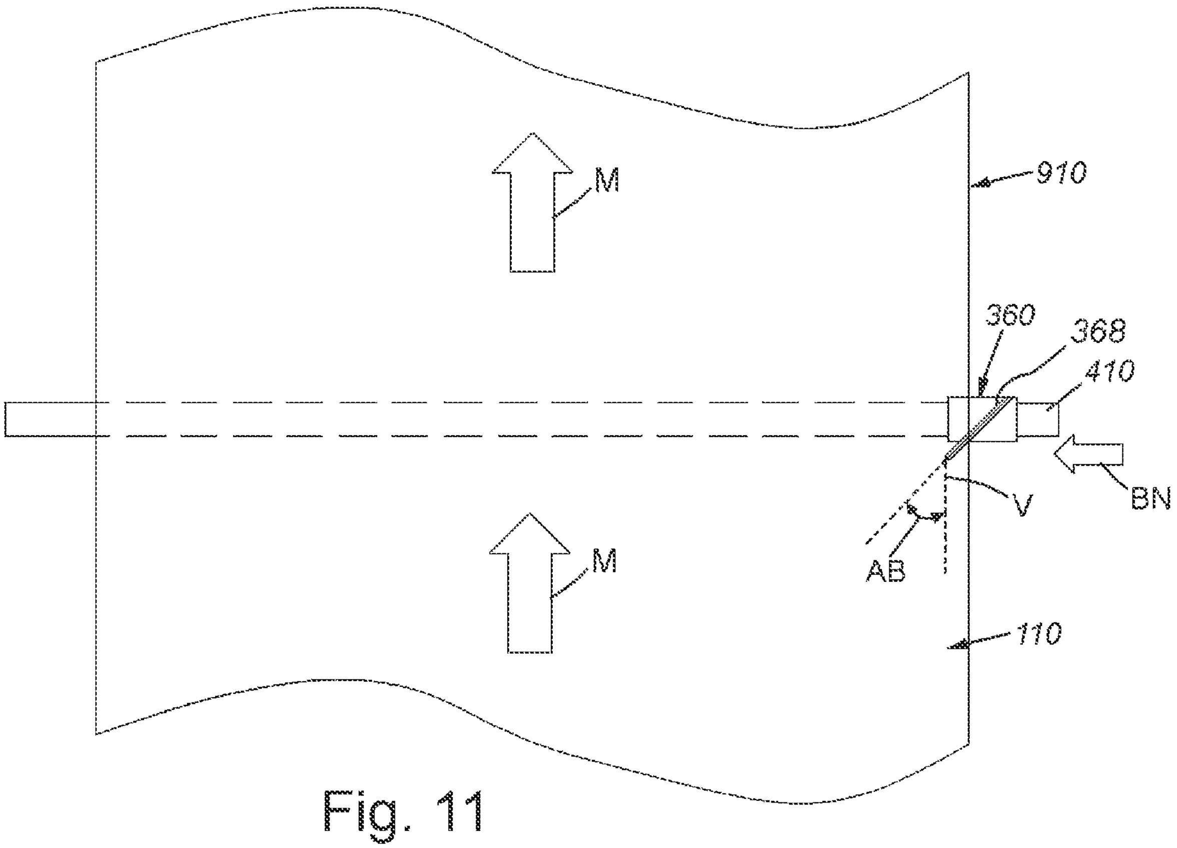
FIGS. 11 and 12 are front and top views, respectively, of the web and web-cutting mechanism shown in FIG. 8, with the blade assembly released by the solenoid and engaging one of the opposing side edges of the web so as to begin separation thereof.
Figure 12:
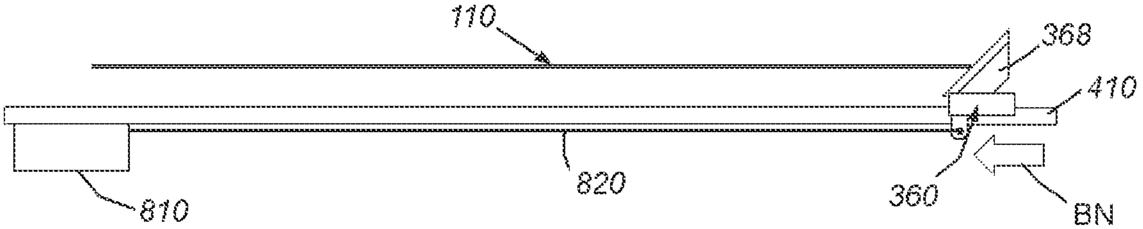

In FIGS. 11 and 12, the stop signal 190 (FIG. 1) has triggered the solenoid assembly 370 to release the pawl 610 by energizing the solenoid 650, and causing the lever 640 to rotate. The bias (arrow BN) of the negator spring assembly 810 and cord 820 causes the released shuttle plate 360 and blade 368 to pass into the edge 910 of the web 110. The engagement of the blade 368 with the tensioned web 110 results in a cutting action. The relative (e.g. 45-degree) angle AB of the blade 368 with respect to the vertical V (in which V is parallel to the edge 910 and direction of motion M) results in a widthwise/transverse (cross-web) component for force based upon the motion (M) of the web. This component effectively draws the blade across the web under force of the web's own motion in the manner of a sailboat travelling at an angle to the wind.

Figure 13:
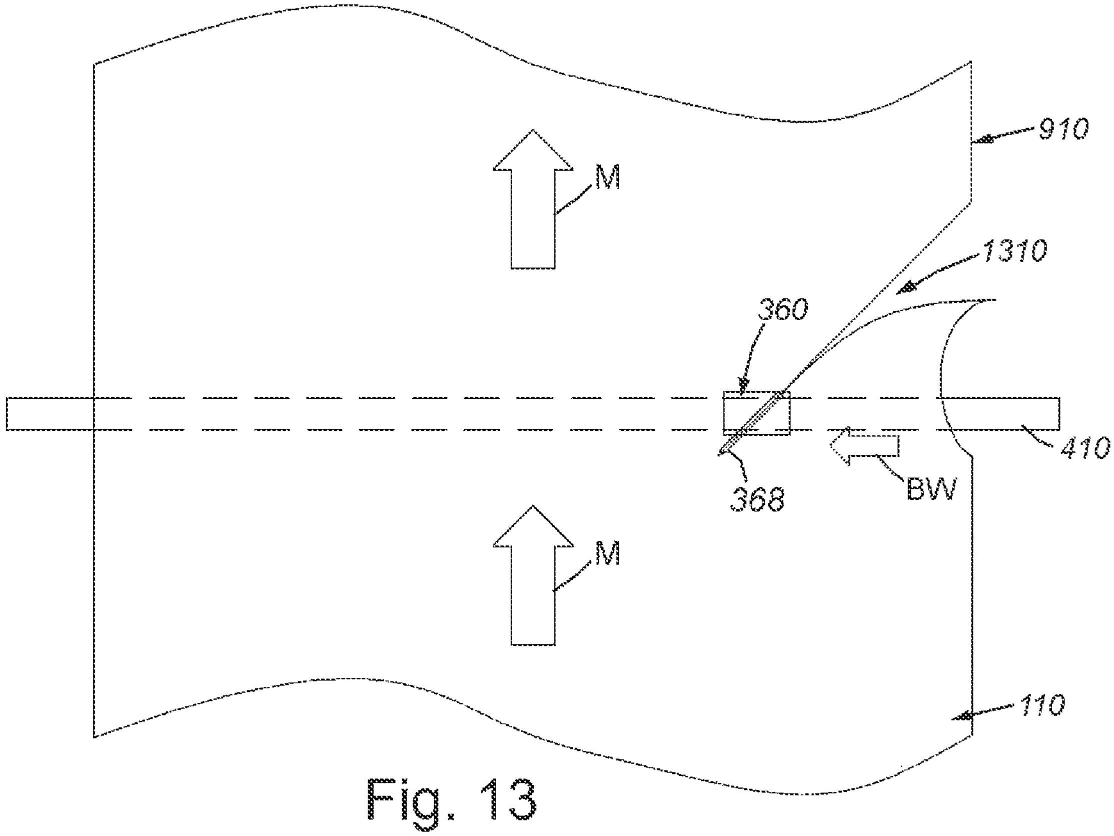
FIGS. 13 and 14 are front and top views, respectively, of the web and web-cutting mechanism shown in FIG. 8, with the blade assembly moving across the web under the bias of roller-driven web motion, and the web being separated thereby.
Figure 14:
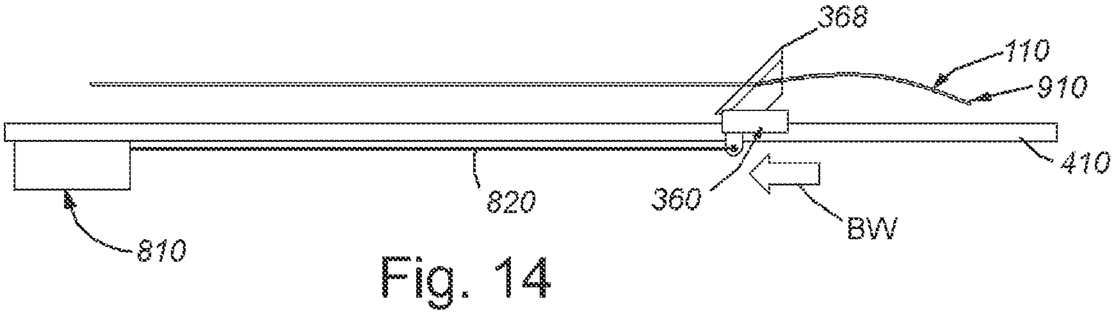

In FIGS. 13 and 14, the blade 368 and shuttle plate assembly 360 have passed substantially into the web 110, forming an angled cut 1310 based on the web's continued motion under the draw of the decelerating roll. The web remains under tension and relatively planar in its uncut region. The cut portion is somewhat free to flap and bend as shown. The blade continues to travel through the tensioned, uncut region under force of the web motion (M), which generates a positive cross-web force component (arrow BW), with a smaller cross-web force exerted by the negator spring assembly, sufficient to ensure take-up of cable 820 as the shuttle plate assembly 360 continues to move across the web.

Figure 15:
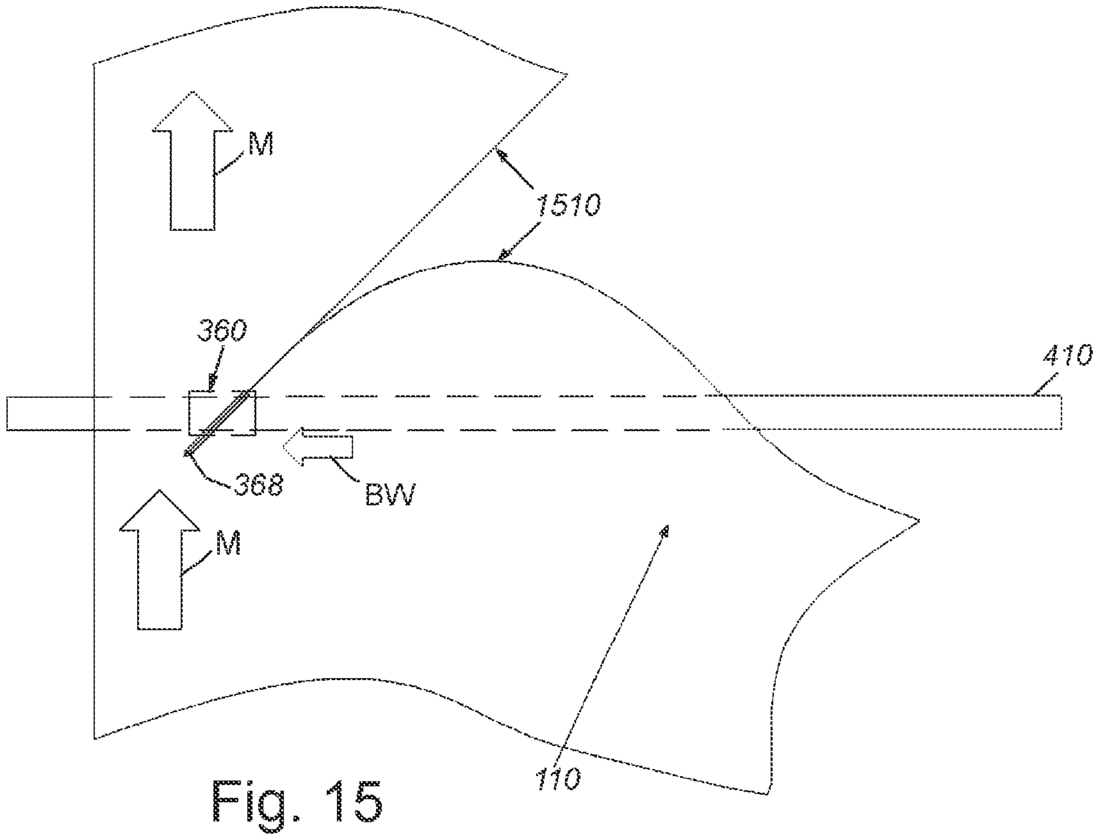
FIGS. 15 and 16 are front and top views, respectively, of the web and web-cutting mechanism shown in FIG. 8, with the blade assembly moved almost fully across the web under the bias of roller-driven web motion, and the web being separated thereby.
Figure 16:
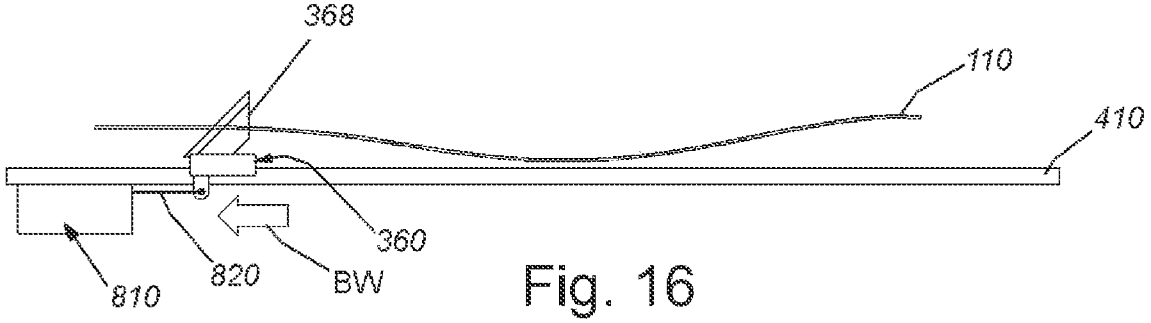
Figure 17:
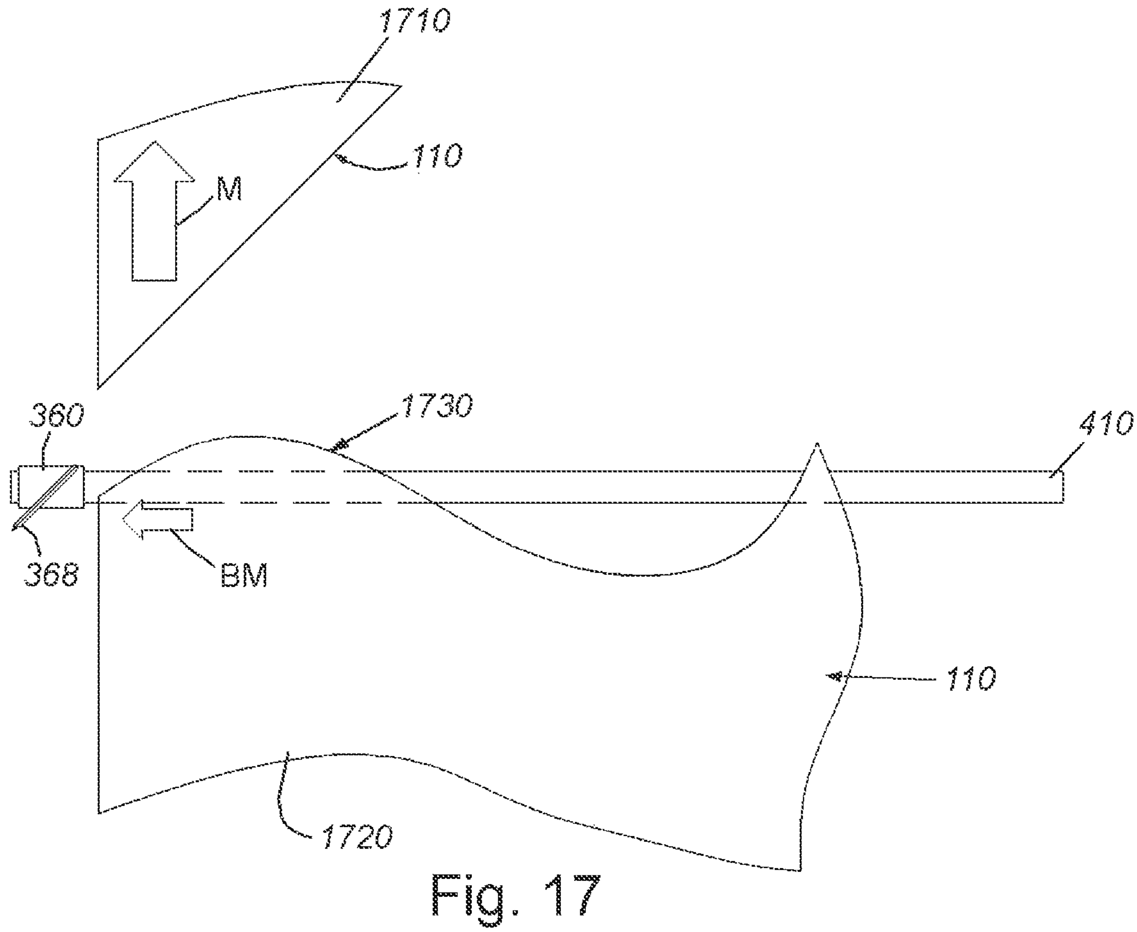
FIGS. 17 and 18 are front and top views, respectively, of the web and web-cutting mechanism shown in FIG. 8, with the blade assembly moved fully across the web under the bias of roller-driven web motion, and the web being fully separated thereby.
Figure 18:
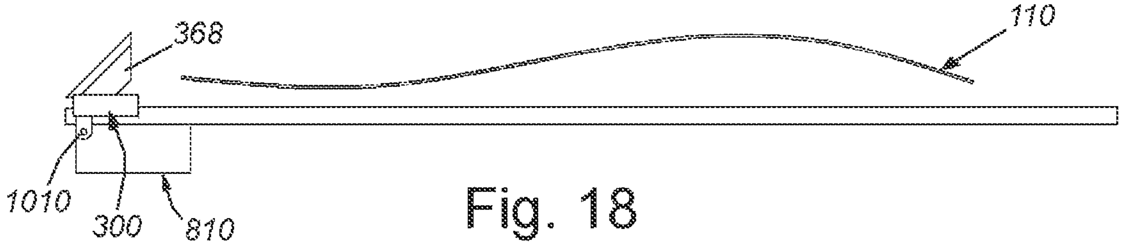

In FIGS. 15 and 16 the cross-web component of force (BW) generated by web motion (M) has caused the blade 368 and shuttle plate assembly 360 to pass substantially through the web 110, generating a large, untensioned section 1510. The shuttle plate has developed significant momentum, sufficient to drive it fully across the wed width. Additionally, the amount of uncut web is small enough break under remaining tension in combination with the angled geometry of the cut line. This is shown in FIGS. 17 and 18, in which, the web 110 is severed into two sections, an upstream section 1720 that has come to a complete stop based on the braking action of the upstream brake drum assembly, and a downstream section 1710 that can continue to travel into the roll as it slowly decelerates to a complete stop. In this manner, the tension on the upstream components and peripherals has been reduced or eliminated, so as to avoid damage. The free end 1730 of the upstream web section 1720 can be later spliced, or otherwise reattached, to the roll as appropriate or taken up by a new roll core after the jam condition has been addresses. Alternatively, a jammed section of upstream web can be discarded and a new free end can be attached to a rewinder roll. Note that the blade 368 and shuttle plate assembly 360 has moved fully across the web 110, and is received adjacent to the negator spring assembly 810. The cable 820 is fully taken up by the assembly 180 so that only the attachment point 1010 remains visible. Momentum generated by the web and/or bias by the negator spring assembly 810 provides requisite force to compete motion (arrow BM) of the shuttle plate assembly 360 along the slide 410. An appropriate (optional) stop that can include a shock absorber (e.g. an elastomeric bumper 450—shown in FIG. 4) can be used to prevent over-travel and/or impact damage by the shuttle plate assembly 360 as it completes its cross-web motion.

Once activated, the shuttle plate assembly 360 remains at rest adjacent to the negator spring assembly 810 until a user grasps the tab 364 and directs the shuttle plate assembly 360 back into engagement with the solenoid assembly pawl (610). The pawl 610 is spring-loaded so that it pivots to give way as the shuttle plate moves over its edge. Once sufficiently moved, the pawl 610 pivots back to reengage and retain the shuttle plate assembly 360 against the cross-web bias of the negator spring assembly 810 and associated cable 820. Notably, the arrangement of covering plates 310 and 310 in the mechanism 170 ensures that the blade 368 is not accessible to the user at any point, even if it becomes stopped by a significant web jam condition part way through its cross-web travel.

It should be clear that the above-described web-cutting mechanism provides a straightforward, relatively low-cost, effective and robust solution to the problem of excessive and damaging web tension during a jam and/or emergency stop condition. The mechanism uses a relatively small number of components that can be constructed from conventional materials such as sheet steel, polymer and aluminum alloy, as well as commercially available (off-the-shelf) components. The blade is inexpensive and readily replaceable. Moreover, the mechanism is carefully designed to avoid dust fowling and injury to users.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Additionally, while a negator spring is used to bias the shuttle assembly and blade into the edged of the web, a variety of "blade-driver" (defined hereby) arrangements can be employed, such as a loaded spring, an air/gas piston, an elastomeric spring, a linear magnetic drive, a pushing solenoid, or any equivalent mechanism that can sufficiently drive the blade into the side of the web so that the motion of the web can thereafter cause further cross-web driving of the blade and shuttle assembly. Also, while a manual reset operation of the blade and shuttle assembly is employed to secure it at the home base (solenoid assembly), a variety of automated mechanisms can be used to reset the blade, such as a linear drive. Moreover, while a screw-on blade fastening system is employed for the blade mount, a variety of alternate mounting systems can be used including various clamps, clips, clamshell housings, etc. Accordingly, this description is meant to be taken only by way of example, and not to otherwise limit the scope of this invention.

What is claimed is:

1. A web handling device comprising:

an input roller that receives web on a feed path from an upstream handling device;

a web output member that is driven to receive the web; and an emergency stop cutting mechanism located between the input roller and the output member that, in response to a stop signal, releases a blade oriented at a non-perpendicular angle to a feed direction of the feed path along a cross-web direction, wherein the blade is engaged with the web in motion, and the blade is biased across the web to separate the web by drawing of the output member.

2. The web handling device as set forth in claim 1 wherein the output member includes a winder and a buffer of web festooned between the input roller and the cutting mechanism.

3. The web handling device as set forth in claim 2 wherein the blade is mounted on a shuttle that is released by a solenoid in response to the stop signal from a location remote from an edge of the web and that is driven into engagement with the web via a spring assembly.

4. The web handling device as set forth in claim 3 wherein the spring assembly comprises a cable and a negator spring assembly that biases the cable.

5. The web handling device as set forth in claim 3, further comprising a ball-bearing slide upon which the shuttle slides located between confronting plates.

6. The web handling device as set forth in claim 5 wherein the shuttle includes a tab that is arranged to allow a user to grasp the tab and slide the shuttle into engagement with the latching member.

7. The web handling device as set forth in claim 6 wherein the tab is located above the upper shoulders so as to allow the user to avoid placing a hand near the blade or an interior of a housing of the emergency stop cutting mechanism.

8. The web handling device as set forth in claim 5 wherein the latching member comprises a rotating pawl connected to a shaft and a lever, the lever being interconnected with a pulling piston of the solenoid.

9. The web handling device as set forth in claim 8 wherein the latching member includes a spring that biases the pawl into engagement with the shuttle when the solenoid is not energized.

10. The web handling device as set forth in claim 3 wherein the blade comprises a utility knife blade.

11. The web handling device as set forth in claim 10 wherein the shuttle includes a blade mount that removably engages the blade and that orients the blade at a non-perpendicular angle of attack with respect to a plane of the web to enhance cutting action.

12. The web handling device mechanism as set forth in claim 3 wherein the blade is oriented at an approximately 45-degree angle with respect to the direction of motion.

13. The web handling device as set forth in claim 12 wherein the shuttle includes a blade mount that removably engages the blade and that orients the blade at a non-perpendicular angle of attack with respect to a plane of the web to enhance cutting action.

14. The web handling device mechanism as set forth in claim 1, further comprising a controller that responds to a web jam or stop condition upstream of a housing, and that generates a signal to operate the emergency stop cutting mechanism in response thereto.

15. The web handling device mechanism as set forth in claim 1 wherein the output member comprises a driven take up roll that is driven as the web is delivered at the input roller.

* * * * *